United States Patent [19]

Shirai et al.

[11] 4,216,240

[45] Aug. 5, 1980

[54] PROCESS FOR PREPARING FIBROUS PROTEIN FOOD PRODUCTS

[75] Inventors: Mitsuru Shirai; Katsutoshi Okamura, both of Yokohama; Shigeru Toba, Kawasaki; Shundo Harada, Kawasaki; Yaeko Mitsuura, Kawasaki, all of Japan

[73] Assignee: Ajinomoto Co., Inc., Tokyo, Japan

[21] Appl. No.: 954,530

[22] Filed: Oct. 25, 1978

Related U.S. Application Data

[63] Continuation-in-part of Ser. No. 813,345, Jul. 6, 1977, abandoned.

[30] Foreign Application Priority Data

Jul. 9, 1976 [JP] Japan .................................. 51-81628

[51] Int. Cl.² .............................................. A23J 3/00
[52] U.S. Cl. ................................... 426/516; 264/328; 426/512; 426/802
[58] Field of Search ............... 426/656, 657, 389, 455, 426/456, 459, 460, 461, 506, 512, 515, 516, 517, 520, 802, 803; 260/112 R, 112 G, 123, 123.5; 264/108, DIG. 26, 239, 299, 319, 328, 329, 330

[56] References Cited

U.S. PATENT DOCUMENTS

| | | | |
|---|---|---|---|
| 3,904,769 | 9/1975 | Sair et al. | 426/516 X |
| 3,904,775 | 9/1975 | Harwood et al. | 426/802 X |
| 3,911,159 | 10/1975 | Heusdens | 426/656 X |
| 3,958,032 | 5/1976 | Merriam | 426/802 X |
| 3,978,244 | 8/1976 | Sair | 426/656 X |
| 4,018,935 | 4/1977 | Catlin et al. | 426/802 X |
| 4,039,694 | 8/1977 | Giddey et al. | 426/802 X |

FOREIGN PATENT DOCUMENTS

7707487   1/1978   Netherlands .

*Primary Examiner*—Arthur L. Corbin
*Attorney, Agent, or Firm*—Oblon, Fisher, Spivak, McClelland & Maier

[57] ABSTRACT

A process for preparing an oriented fibrous protein product which comprises holding a flowable mixture of protein-containing materials in an injection machine and then injecting said flowable mixture through a nozzle at ram pressures between 500 and 3000 kg/cm² into an environment at substantially atmospheric pressure or into a mold.

8 Claims, No Drawings

PROCESS FOR PREPARING FIBROUS PROTEIN FOOD PRODUCTS

BACKGROUND OF THE INVENTION

This application is a continuation-in-part of application Ser. Number 813,345 filed on July 6, 1977, now abandoned.

1. Field of the Invention

The present invention relates to a process for preparing fibrous protein food products, particularly a process for preparing the same by holding a moist mixture of protein-containing materials in an injection machine as a flowable mixture and then injecting the flowable mixture through a nozzle at elevated pressures into an environment substantially at atmospheric pressure or into a mold.

2. Description of the Prior Art

It would be desirable to provide meat-like products from inexpensive protein sources. Popular meat and meat products such as natural meat, poultry, shell fish and fish have been considered to be popular because of their preferred texture brought about by a system of protein fibers held together by a suitable binder. In order to prepare meat-like products having such excellent textures from inexpensive protein sources, it is apparently necessary to provide an oriented and fibrous structure in the protein materials, and to hold and bind the resulting oriented fibrous materials together.

Merriam, U.S. Pat. No. 3,958,032 discusses the preparation of "balloon puffed" food products which are usually proteinaceous, prepared by occluding a relatively small amount of air within the protein mixture so that balloon-puffing is accomplished upon extruding the mixture. The pressures in the discharge zone of the extrusion machine are low, so as to allow for the evaporation of the occluded water.

Sair et al, U.S. Pat. No. 3,904,769 also discusses the preparation of balloon-puffed products from proteinaceous materials. The pressures at the die adaptor of the extrusion machine in this reference can go as high as 132 kg/cm$^2$. However, by the time the protein mixture reaches the open end of the nozzle, the pressure of the mixture is substantially atmospheric in order to prevent "explosion puffing". The products have oriented structure and organization, and are arranged longitudinally in laminar or sheet-like layers. The products however, are not fibrous.

Heusdens, U.S. Pat. No. 3,911,159 discloses the formation of filamentous protein structures of improved tenderness formed from an aqueous slurry of protein containing material and a critical amount of a material selected from the group consisting of cellulose and carbohydrate by-products. The slurry is continuously heated under pressure and then extruded. The pressures in this reference vary between about 50 and 5000 psig (3.6–360 kg/cm$^2$). Although the product of Heusdens is filamentous, it has a noodle-like consistency rather than a fibrous, textured consistency.

A need therefore continues to exist for the preparation of protein food products having a texture simulating that of natural meat, poultry, shellfish and shell or meat products, from inexpensive protein sources at low cost without water pollution and noise.

SUMMARY OF THE INVENTION

It is therefore an object of the invention to provide a process for preparing excellent protein food products having textures simulating those of natural meats, poultry, shellfish and shell or meat products from inexpensive protein sources.

These and other objects of the invention have been accomplished by finding that when a moist mixture of protein-containing materials is held in an injection machine as a flowable mixture and injected through a nozzle at elevated pressures into an environment at substantially atmospheric pressure or into a mold, the injected fluid of the flowable substance is subjected to an extremely high shearing force and shear rate, and the protein materials are remarkably oriented and become highly fibrous. When the flowable substance is injected into an environment at substantially atmospheric pressure, well-oriented fibers are obtained. Fibrous protein foods are directly obtained in the case when the substances are injected into molds.

Another object of the invention has been accomplished by providing a process for producing an oriented fibrous protein product which comprises forming a flowable protein-containing mixture; and denaturing said flowable protein-containing mixture prior to or subsequent to injecting said flowable protein-containing mixture through a nozzle at rates of from 5 to 1500 g/sec. and at ram pressures between 500 and 3000 kg/cm$^2$ into a pressurized mold.

DESCRIPTION OF THE PREFERRED EMBODIMENTS

In accordance with the process of the present invention, fibrous protein food products having a structure simulating that of meat, poultry, shellfish and fish or meat products are easily prepared at a low cost, and such protein food products are easily modeled after various kinds of meats and meat products by controlling process and formulation variables (raw materials, additives, moisture content, etc.)

Protein-containing materials used in this invention mean isolated proteins or mixtures of protein and non-protein materials. The sources of proteins in the protein-containing materials are not critical, and any protein sources such as vegetable, animal and single cell proteins can be used. The typical examples of protein sources include vegetable proteins such as oil seeds (defatted soy bean meal, peanut meal, cotton seed meal, rapeseed meal, sesame or other vegetable protein meal, and concentrated or isolated proteins thereof), and grain proteins (wheat gluten, corn gluten, and rice protein); animal proteins such as cheap cuts of meat, poultry or fish, meat scraps, poultry scraps or fish scraps, minced fish, milk protein and egg protein; and single cell proteins such as yeast protein.

Among the above protein sources, oil seeds, grain proteins and animal proteins are preferred for the quality of the finished products, the commercial availability, and the cost. Especially preferred are soy proteins (defatted soybean meal, concentrated and isolated soy protein), wheat gluten, cheap cuts of meat; poultry or fish not having utility for direct sale to consumers, such as poultry paste recovered from laying chickens, and mixtures containing these materials as main source. If it is desired to use mainly vegetable proteins, a mixture of soy protein and wheat gluten is preferred in view of the texture of the finished products. The preferable weight ratio of these proteins is 1:9–9:1 on a pure protein basis.

These protein-containing materials preferably contain above 30% by weight protein on a dry basis, and the tensile strength of the finished products becomes larger with the protein content of the starting materials. It is preferred that the proteins in the starting materials not be substantially denatured, and be heat coagulable or heat-settable. In the case of oil seed proteins and single cell proteins, they are preferably used in the form of cell-free extracts. As mentioned above, high-protein containing materials such as isolated proteins are used as starting materials in this invention, and also protein mixtures having less than 70% non-protein materials are similarly used. Thus, other materials may be mixed with the protein sources.

For example, carbohydrates such as grain flours and starch, gums such as arabian gum and carrageenan, colors, oils and fats and other flavoring ingredients may be added. In order to adjust the pH of the starting moist mixture and to vary the characteristics of the finished products, water-soluble acids and bases such as hydrochloric acid, phosphoric acid, lactic acid, citric acid, sodium hydroxide, ammonium hydroxide and sodium bicarbonate may be used. The pH of the starting moist mixtures used in this invention may be varied in the range of 3 to 12, preferably 4 to 9, most preferably 6 to 8.5. Organic and inorganic reducing agents such as cysteine and sodium sulfite, or plasticizers such as glycerin may be used for improving the flowability of the starting mixture.

The protein-containing materials are mixed with water at the first stage of the present invention. The moisture content of the mixture may vary widely, the optimum content depending upon the nature of starting materials and finished products. Generally, the moisture content may be from 20 to 80% by weight, but preferably it is maintained at about 25 to 65% by weight. The mixture is then treated in an injection machine as described hereinafter, but it is also possible to mix the starting protein-containing materials (protein sources and additives, if any) with water in the machine. As it is important to mix the protein-containing materials with sufficient water so as to distribute the water in the materials as uniformly as possible, the mixing may be preferably carried out with heating.

Any injection machines may be used in the process of this invention. No specific functions are required of the machines, and injection machines of the type normally employed in the plastics industry are also effective to the process of this invention. Injection machines are used in the plastics industry, more particularly in plastic injection molding for producing precision parts having no strain. The same or similar machines are also effective for the object of this invention which is quite different from that of plastic injection moldings, and which is to prepare fibrous protein food products by providing an oriented and fibrous structure in the protein materials, and holding and binding the resulting oriented fibrous materials together. The preferable injection machines usually comprise a plasticizing means for converting the feed materials into flowable substances, a means for generating high pressures (usually, oil pressure generator), a means for injecting materials, a nozzle means, a sequential control means, and instruments. The former four means are essential for the machines employed in this invention with the exception of special cases. The machines are usually classified into the following three categories, every one of which may be a vertical or horizontal type; (1) machines in which materials are compressed and transferred by an injection plunger, heated and plasticized by a heating cylinder and a torpedo, and injected through a nozzle; (2) machines equipped with preplasticizing means; (3) machines in which materials are transferred by a screw, heated and plasticized during the transferring, and injected by a transferable screw.

The moist mixture previously prepared is fed into an injection machine having the above-mentioned means, or the starting materials themselves are fed into a machine having a mixing means and additionally, the mixture is held in the machine as a flowable substance and then injected through a nozzle into an environment at a substantially atmospheric pressure or into molds The plasticizing of the starting mixture is usually made by heating in an injection machine or in a preplasticizing means, except for the case when the starting mixture consists mainly of meat, poultry or fish paste because it is already plasticized and flowable.

The temperature in the injection machine varies according to the quality and source of the starting materials, the moisture content, the amount of additives, and the temperature in the molds, if any. Generally, it is above the temperature at which the starting mixture becomes flowable, the upper limit being the temperature at which the flowable mixture begins to burn. Normally, the temperature will be between 20° C. and 300° C., preferably between 20° C. and 250° C. The holding period of the mixture in the machine is inversely proportional to the temperature, and is between 5 seconds and 30 minutes, preferably between 5 seconds and 20 minutes. A constant amount of the mixture held for a period is then injected through a nozzle (of which inner diameter is usually not larger than 10 mm) at elevated pressures into an environment at a substantially atmospheric pressure or into molds. The injection pressure (injection ram pressure) varies depending upon the type and length of the machine, and the physical properties of the flowable mixture and of the finished product, but is between 500 kg/cm$^2$ and 3,000 kg/cm$^2$ preferably between 1000 kg/cm$^2$ and 2000 kg/cm$^2$. The injection rates at the nozzle at the above-mentioned elevated pressures usually reach 5 g/sec. to 1500 g/sec. The expression g/sec refers to the amount of material (in grams) ejected through the nozzle of the injection molding machine per second. The flowable mixture is then subjected to an extremely high shearing force and shear rate, and the protein materials are remarkably oriented and become highly fibrous. The exiting rate is conventional extrusion methods is about 1/10 to 1/100 times as large as the injection rates of this invention, and furthermore the way of subjecting the flowable mixture to a shearing force in the present invention is quite different from that of the conventional methods.

When the flowable mixture is injected at elevated pressures and rates into an environment at a substantially atmospheric pressure in accordance with the process of this invention, dense fibers, well-oriented parallel to the direction of injection are obtained. The density of the fibers obtained is above 0.5 g/cc, usually above 0.9 g/cc, depending upon the raw materials and operation conditions. In the case that the mixture is injected not into molds but into a substantially atmospheric environment, it is preferable to select relatively lower temperatures (up to 160° C., preferably up to 140° C.) than those in the injection machine in the point of the quality of the finished products. When the flowable substance is not denatured in the machine and is injected, it is necessary to heat-set the injected fibers.

When the flowable mixture is injected into molds in accordance with the process of this invention, well-oriented and fibrous protein foods are directly obtained. In this case, it is necessary to denature or heat-set the protein materials either in the injection machine or in the molds, and thus it is also necessary to heat the injection machine or molds to above 80° C. If the temperature of the molds is not enough for denaturing the protein materials, the temperature in the injection machine shall be preferably between 80° C. and 250° C. However, if the temperature of the molds is high enough for the denaturation, the temperatures in the injection machine are selected from the range of 20° C. to 300° C., preferably 20° C. to 250° C. In case that the materials are denatured in the injection machine, the molds may be cooled, economically with water, and also may be further cooled with a liquid refrigerant so as to fix the orientation more perfectly.

When using molds, these need to be tightly closed during injection and subsequent operations at sufficient pressures (mold pressures); protein foods having various densities are obtained by varying or controlling the mold pressures. The mold pressures vary depending on the composition of the injected materials, the injection pressure, and the desired physical properties of the protein foods, especially the density thereof. Generally, when the flowable mixture is injected at high injection pressures into molds tightened at high pressures, protein foods having a high density are obtained, while relatively bulky protein foods are obtained proceeding in a manner contrary to the above. The pressures in the molds are usually above 20 kg/cm$^2$ on a basis of projected area of mold cavity. The flowable substances are injected into the molds, and subsequently or simultaneously the mold pressures are released to some extent, or gases such as air and nitrogen gas are pressed into the molds to yield protein foods expanded to a certain desired extent. It is also possible to produce somewhat dense food products by injecting the flowable substances into molds, and subsequently additionally pressing the molds.

The injected substances are held in the molds for a predetermined constant period, and taken out of the molds after being cooled or not. If the food products are not cooled in the molds, the foods taken out may then be cooled. The holding period in the molds varies depending on the shape and thickness of the mold and usually may not be less than 5 seconds.

Even by the conventional extrusion methods, rods, films and sheets of protein foods are obtained; however other shapes of foods are hardly obtained. The present invention makes it possible to produce any shapes of protein foods in a single step with easy operations. Furthermore, surprisingly wide variety of protein foods can be produced by making various modifications of the apparatuses and controlling the operation conditions employed in the present invention. Namely, in addition to the cubes and balls of meat-like products, there are obtained products simulating meats having three-dimensional networks such as steak and poultry muscle, and products simulating meats consisting of muscular fibers such as crab meat and shrimp meat by making modifications into the shape of the molds, the injection directions, and the additives. Multi-colored meat-like products having a heterogeneous texture simulating that of bacon or tender beef distributed with small particles of fat can also be obtained by injecting simultaneously, protein-containing materials and other substances such as solid fat or the fat of meat-like substances through two or more nozzles into a mold. Furthermore rings and cylinders of meat-like products can also be formed. Further, the process of this invention can also produce in a single step protein foods containing inedible solids simulating meats with bone, or regular ham with bone (long-cut ham, short-cut ham, etc.), which are never imagined in view of the conventional methods.

As explained herein before, the present invention has the following advantages:

(1) In accordance with the process of the present invention, the flowable mixtures of protein-containing materials are injected through a nozzle at elevated pressures and speeds into an environment at a substantially atmospheric pressure or into molds to give protein fibers well-oriented parallel to the direction of injection or well-oriented fibrous protein foods, respectively.

(2) Protein foods can be easily obtained in any shape by injecting the materials into molds. The texture, tenderness and "chewiness" of the products simulates those of natural products.

(3) Protein foods simulating various kinds of meats and meat products can be obtained in a single step by injecting simultaneously the protein-containing materials and other edible materials into a mold through two or more nozzles, or by putting inedible materials in molds.

(4) Protein foods having various densities can be obtained by controlling or varying the pressures in the molds, or by introducing gases into the molds under pressures.

Having now generally described the invention, the same will become clearer by reference to certain specific examples which are included herein only for purposes of illustration and are not intended to be limiting thereof.

EXAMPLE 1

A mixture of 600 g defatted soy flour (protein content 50%), 600 g wheat gluten (protein content 70%) and 800 ml water was prepared at pH 6.6, and was fed into a laboratory, vertical and screw type injection machine (L/D=16, diameter of screw=32 mm, inner diameter of nozzle=3.5 mm) equipped with a mold having a cubic cavity (85 mm×45 mm×2 mm). The heating cylinder of the machine consisted of three heating zones with cylinder temperatures of 100° C., 140° C., and 130° C. from inlet to outlet, respectively.

The mixture was converted to a flowable substance in the heating cylinder and held for 4 minutes, and injected at 500 kg/cm$^2$ into the mold kept at 60° C. and tightened at 1,000 kg/cm$^2$. The injected substance was held in the mold for 15 seconds, and then taken out from the mold.

In another run, the same procedure was repeated but the mold was kept at 120° C.

Both products were well-oriented, and had a texture simulating that of meat.

EXAMPLE 2

The procedure followed in Example 1 was repeated but the cylinder temperatures were changed to 60° C., 80° C. and 120° C. from inlet to outlet, respectively, and the flowable mixture was injected into an atmospheric environment instead of the mold. The product was well-oriented fibers (density: 1.2 g/cc).

EXAMPLE 3

Three mixtures were prepared by using the following materials:

|  | A | B | C |
|---|---|---|---|
| defatted soy flour (protein content: 50%) | 650 g | 200 g | 200 g |
| frozen minced fish (Grade C) (moisture content: 80% by wt.) | — | 500 g | — |
| cuts of chicken (moisture content: 80% by wt.) | — | — | 500 g |
| Water | 350 ml | — | — |
| pH | 6.7 | 6.5 | 6.5 |

These mixtures were treated in the injection machine and injected into the mold used for Example 1 under the following conditions:

| | |
|---|---|
| Cylinder Temperatures: | inlet 80° C. |
| | middle 140° C. |
| | outlet 120° C. |
| Injection Pressure: | 600 kg/cm$^2$ |
| Mold Temperature: | 80° C. |
| Mold Pressure: | 1,000 kg/cm$^2$ |
| Holding Period in Mold: | 15 sec. |

Every product had a texture like lacks ham. The product derived from the mixture A was somewhat harder than those from the mixtures B and C.

EXAMPLE 4

A mixture of the following substances was prepared. The pH was 6.4.

| | |
|---|---|
| Frozen minced fish (Grade C) (moisture content 80% by wt) | 1,000 g |
| salt | 25 g |
| Potato starch | 30 g |
| Sugar | 40 g |
| Sodium glutamate | 15 g |
| Crab extract | 5 g |

The mixture was fed into the injection machine, held for 4 minutes, and injected into the mold used for Example 1 under the following conditions:

| | |
|---|---|
| Cylinder Temperatures: | inlet 60° C. |
| | middle 80° C. |
| | outlet 120° C. |
| Injection Pressure: | 300 kg/cm$^2$ |
| Mold Temperature: | 120° C. |
| Mold Pressure: | 1,000 kg/cm$^2$ |
| Holding Period in Mold: | 15 sec. |

The product was a fibrous material well-oriented in the direction rectangular to the injection. The product was cut in a width of 1 mm to give protein food having a texture, structure and taste simulating those of crab meat.

EXAMPLE 5

A mixture of 1,050 g defatted soy flour, (protein content 50%), 1,050 wheat gluten (protein content 70%) and 900 ml water was prepared, pH 6.6, and was fed into a laboratory, horizontal and screw type injection machine (L/D=20, diameter of screw=25 mm, inner diameter of nozzle=3 mm) equipped with a mold having a cylindrical cavity (100 mm in diameter×5 mm in thickness). The heating cylinder of the machine consisted of three heating zones with cylinder temperatures of 120° C., 150° C. and 145° C. from inlet to outlet, respectively.

The mixture was converted to a flowable substance in the heating cylinder, held for 3 minutes, and injected at 1,830 kg/cm$^2$ into the mold kept at 80° C. and tightened at 35 kg/cm$^2$. At the end of injection, the mold was expanded to the extent of 10 mm in thickness. The injected substance was then held in the mold for 30 seconds, and taken out from the mold.

The product obtained had a density of 0.6 g/cc, and was found to have a somewhat rough texture resembling that of cod meat upon hydration.

EXAMPLE 6

A mixture of 840 g defatted soy flour (protein content 50%), 360 g wheat gluten (protein content 70%) and 800 g water was prepared, pH 6.7, and fed into a laboratory, horizontal and screw type injection machine (L/D=14, diameter of screw=30 mm, inner diameter of nozzle=4 mm) equipped with a mold having a cylindrical cavity (100 mm in diameter×7 mm in thickness). The heating cylinder of the machine consisted of three heating zones with cylinder temperatures of 80° C., 180° C. and 140° C. from inlet to outlet, respectively.

The mixture was converted to a flowable substance in the heating cylinder, held for 3 minutes and injected at 530 kg/cm$^2$ into the mold kept at 70° C. and tightened at 35 kg/cm$^2$. At the end of injection, the mold was pressed to the extent of 2 mm in thickness at an additional pressure of 20 kg/cm$^2$. The injected substance was then held in the mold for 60 seconds, and taken out.

The product consisted of fibrous material, of which orientation was somewhat disordered, and was found to have a meat-like texture when hydrated in boiling water for 15 minutes.

What is claimed and intented to be covered by Letters Patent is:

1. A process for preparing an oriented fibrous protein product which comprises:
   holding a flowable mixture consisting essentially of protein containing materials in an injection machine and then
   injecting said flowable mixture through a nozzle at ram pressures between 1000 and 2000 kg/cm$^2$ into an environment at substantially atmospheric pressure or into a mold.

2. The process of claim 1, wherein said protein-containing materials contain above 30% by weight protein on a dry basis, the moisture content of said mixture is from 20 to 80% by weight and the temperature of said injection machine and said mold when present, are below 300° C.

3. The process of claim 2 wherein said moisture content is from 25 to 65% by weight, and the temperature of said machine and, when present, said mold is below 250° C.

4. The process of claim 1 wherein at least one of said machine and said mold has a temperature above 80° C.

5. A process for producing an oriented fibrous protein product which comprises:
   forming a flowable protein-containing mixture;
   denaturing said flowable protein-containing mixture prior to or subsequent to
   injecting said flowable protein-containing mixture through a nozzle at rates of from 5 to 1500 g/sec.

and at ram pressures between 1000 and 2000 kg/cm² into a pressurized mold.

6. The process of claim 5 wherein said protein-containing mixture is held in said mold for a period of not less than 5 seconds prior to removing said mixture from said mold.

7. The process of claim 5, wherein said mold is held at a pressure of at least 20 kg/cm².

8. The process of claim 5, wherein subsequent to said injection, said mold is further pressurized.

* * * * *